United States Patent [19]
Froumajou

[11] 3,774,712
[45] Nov. 27, 1973

[54] ARRANGEMENT OF AN ENGINE-TRANSMISSION UNIT IN AN AUTOMOBILE VEHICLE

[75] Inventor: Armand Froumajou, Pontoise, France

[73] Assignees: Automobiles Peugeot, Paris; Regie Nationale des Usines Renault, Billancourt, France

[22] Filed: Dec. 13, 1971

[21] Appl. No.: 207,044

[30] Foreign Application Priority Data
Dec. 31, 1971 France .............................. 7047497

[52] U.S. Cl. .............................. 180/82 R, 180/91 R
[51] Int. Cl. ............................................. B60r 21/00
[58] Field of Search ............... 180/82, 91, 89, 64 L; 296/65 A

[56] References Cited
UNITED STATES PATENTS 3,525,413   8/1970   Kripke .............................. 180/82 R
3,589,466   6/1971   Dudley .............................. 180/82 R

*Primary Examiner*—Kenneth H. Betts
*Assistant Examiner*—Reinhard Eisenzopf
*Attorney*—Robert S. Swecker

[57] ABSTRACT

An arrangement in an automobile vehicle in which inclined downwardly-facing faces on extensions rigidly integral with the rigid framework of the vehicle are adapted to co-operate with second faces on the engine-transmission unit in such manner that when the unit is urged into the vehicle owing to a violent shock on the unit having a longitudinal component the second faces come into contact with the inclined faces which act as guide ramps to deviate the unit downwardly of the framework.

6 Claims, 3 Drawing Figures

ARRANGEMENT OF AN ENGINE-TRANSMISSION UNIT IN AN AUTOMOBILE VEHICLE

The present invention relates to an arrangement of an engine-transmission unit in an automobile vehicle which increases the safety of the occupants of the vehicle.

It is known that automobile vehicles have a compartment for the passengers which is as rigid and indeformable as possible and constitutes a protective unit, and parts disposed respectively at the front and at the rear of the compartment which are more easily deformable so as to absorb possible shocks by the absorption of a certain amount of kinetic energy upon impact. Now the engine-transmission unit constitutes a practically indeformable mass so that if the engine compartment, whether it be disposed at the front or at the rear of the vehicle, is crushed considerably, this unit is liable to push in relatively weak parts of the body and penetrate the interior of the central unit and cause serious injury to the occupants. If this danger is to be avoided, the crushing possibilities of the front and/or rear parts of the vehicle must be limited. However, this results in subjecting the vehicle and its occupants to a very high deceleration which can also cause serious injury. Another arrangement, intended to protect as far as possible the passenger compartment in the event of shocks occurring at ever-increasing speeds, consists in increasing to an exaggerated extent the dimension of the engine compartment so as to impart thereto a sufficiently large crushing capacity without danger of causing the engine-transmission unit to penetrate the passenger compartment. The drawback of this arrangement is obvious and results in an excessive increase in the dimensions of the vehicle.

An object of the invention is to remedy the various drawbacks just mentioned and to provide an arrangement of the engine-transmission unit in the engine compartment which allows a large crushing capacity of the latter without this resulting in an increase in its dimensions and which in fact diminishes the risk of penetration of the engine-transmission unit into the passenger compartment in the event of a sufficiently violent shock.

In the arrangement according to the invention, the framework of the vehicle comprises at least one inclined rigid element which extends into the engine compartment from a low point in the vicinity of the centre part of the vehicle to a high point nearer the adjacent end of the vehicle, the engine-transmission unit having at least one support face adapted to cooperate with a lower face of said element which constitutes a ramp, whereby, in the event of a sufficiently violent shock having a longitudinal component, the engine unit is caused to move downwardly and toward the centre part of the vehicle, the unit being guided by said rigid element.

According to one embodiment of the invention, in the case where the framework of the vehicle comprises two side members, each of the side members has an extension which extends into the engine compartment upwardly toward the adjacent end of the vehicle, the two extensions constituting said element and co-operating with two conjugate faces of the engine-transmission unit.

Each support face can be constituted by a part of the case or of the engine-transmission unit or by elements which are part of or attached to the unit and extend laterally from the latter.

Further features and advantages of the invention will be apparent from the ensuing description with reference to the accompanying drawings.

In the drawings:

FIG 1. is a side elevational view of an arrangement of a transverse engine-transmission unit located in a front engine compartment of a vehicle;

Figure 1:
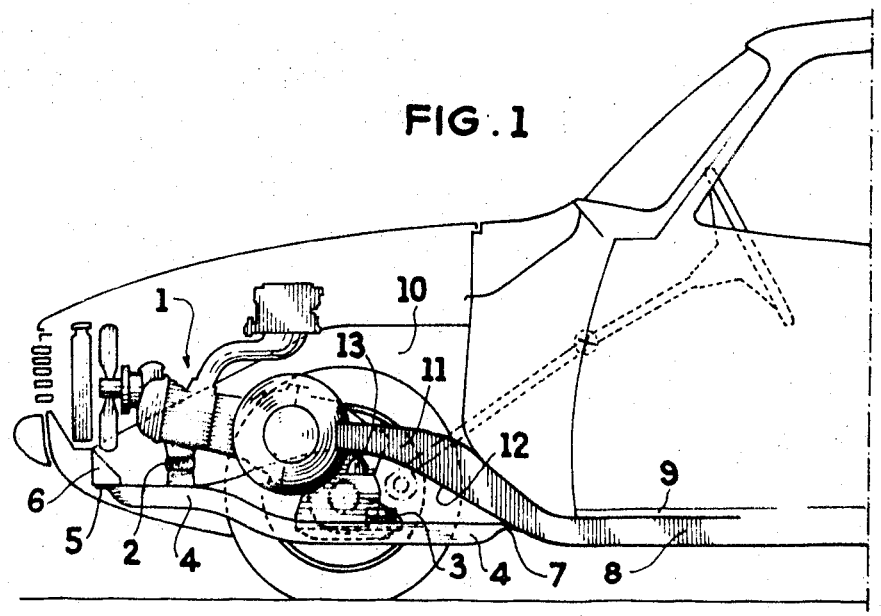
Figure 2:
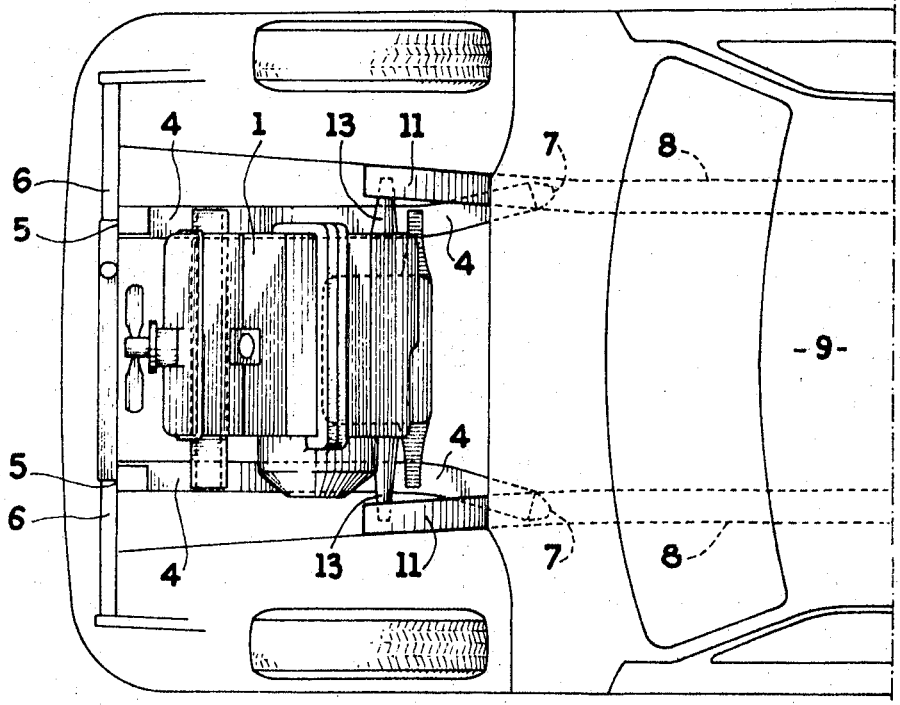
FIG. 2 is a plan view of the arrangement shown in FIG. 1.

The invention will be described as applied to the arrangement of a transverse engine-transmission unit disposed in a front engine compartment of a vehicle, but it must be understood that it also applies to the case of a transverse engine disposed at the rear of the vehicle or to a longitudinal engine disposed at the front or at the rear.

The engine-transmission unit 1 rests in the conventional manner, through yieldable supports 2,3 on a cradle comprising two members 4 fixed at the front at 5 to a transverse member 6 and at the rear at 7 to side members 8. The side members 8 are disposed partly under the floor 9 of the vehicle and extend forwardly into an engine compartment 10 in the form of two sections 11 which extend upwardly and forwardly from the centre part of the vehicle. The side members 8 and sections 11 form part of a rigid framework which is more rigid than the cradle so that in the event that the front of the vehicle receives a violent shock having a longitudinal component exceeding a predetermined magnitude, the cradle collapses before the rigid framework. It will be observed that the sections 11 terminate short of the front of the vehicle. The lower faces of these sections 11 define inclined guide ramps 12.

Figure 3:
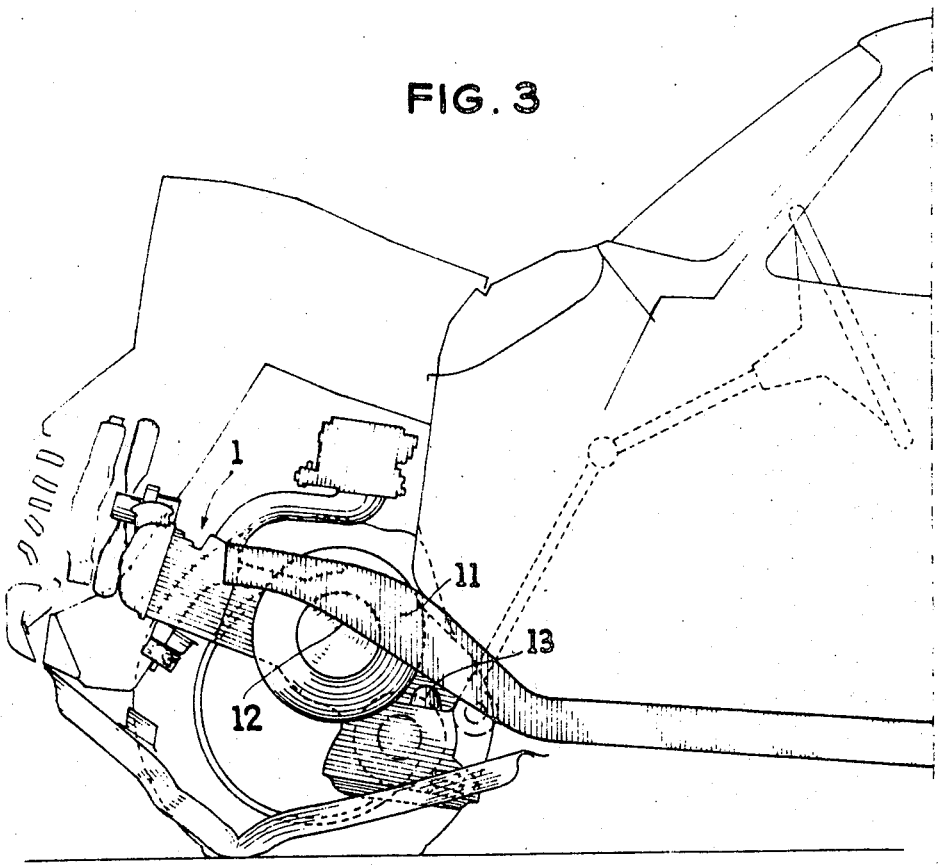
FIG. 3 is a side elevational view of a vehicle which has undergone a violent front shock.

The engine-transmission unit is provided on each side with a projecting portion 13, these projecting portions being integral with the case or any other part of the engine-transmission unit and defining upper faces which are disposed, in the normal position of assembly of the engine (FIG. 1), slightly below the end portions of the sections 11. The projecting portions 13 can be a single piece with the unit or attached to the unit. Upon a violent front shock, or in any case a shock having a sufficiently large longitudinal component, the unit 1 is displaced rearwardly and, in the course of this displacement, the upper faces of the lateral projecting portions 13 come into contact with and slide along the lower guide faces 12 of the sections 11 so that the unit and the members 4 of the cradle are urged downwardly (FIG. 3) and the sections 11 and the front part of the passenger compartment possibly slightly raised. It can be seen that the shortening of the engine compartment, while being very considerable and consequently absorbing a large amount of energy, occurs while allowing the passenger compartment to retain its original shape with no penetration of the engine-transmission unit into this passenger compartment.

It will be understood that such an arrangement is of very high interest, since it considerably improves the conditions of safety of the occupants of the vehicle without necessitating an elongation of the engine compartment and without requiring a considerable and costly new arrangement of the structure of the vehicle.

As already mentioned at the beginning of the description, a similar arrangement may be employed with similar advantages in a vehicle whose engine-transmission unit is disposed transversely at the rear or longitudinally at the front or at the rear of the vehicle.

It will be understood that if a part of the case or of the engine-transmission unit is engaged under the end portions of the sections 11 it constitutes in itself the support face adapted to co-operate with the ramp 12 with no need to provide special projecting portions such as the projecting portions 13.

Having now described my invention what I claim and desire to secure by Letters Patent is :

1. In a vehicle having a rigid framework and a front end and rear end : a cradle located adjacent one of said ends, means defining an inclined rigid first face rigidly integral with said framework, said framework and said first face terminating short of said one end to facilitate a crushing of said vehicle at said one end in the event of a violent shock on said one end which has a longitudinal component exceeding a predetermined magnitude, said face facing downwardly and being upwardly inclined from a point intermediate said ends of the vehicle toward said one end of the vehicle, an engine-transmission unit mounted on said cradle so as to be supported by said cradle, said framework and said means defining said rigid first face being more rigid than said cradle whereby upon said violent shock said cradle collapses before said first face and said framework, said unit having means defining a second face which faces upwardly and is in spaced relation to said first face and is capable of coming into contact with and travelling along and being deviated by said first face when said unit is shifted substantially longitudinally of the vehicle in the event of said violent shock on said one end whereby said unit is deviated downwardly of the framework as said unit moves toward the end of the vehicle opposed to said one end.

2. The structure claimed in claim 1, wherein said engine of said unit has a crank case and said means defining said second face is part of said crank case.

3. The structure claimed in claim 1, wherein said engine of said unit has a cylinder block and said means defining said second face is part of said cylinder block.

4. In a vehicle having a rigid framework and a front end and a rear end : a cradle located adjacent one of said ends, a first lateral longitudinally extending extension and a second lateral longitudinally extending extension both extensions being rigidly integral with said framework, said framework and said extensions terminating short of said one end to facilitate a crushing of said vehicle at said one end in the event of a violent shock on said one end which has a longitudinal component exceeding a predetermined magnitude, each extension defining a first face which faces downwardly and is upwardly inclined from a point intermediate said vehicle ends toward said one end of the vehicle, an engine-transmission unit mounted on said cradle so as to be supported by said cradle, said framework and said extensions being more rigid than said cradle whereby upon said violent shock said cradle collapses before said extensions and said framework, said unit comprising first lateral rigid means defining an upper face and second lateral rigid means defining an upper face, said upper faces being respectively in spaced relation to said first faces and capable of coming into contact with the travelling along and being deviated by said first faces when said unit is shifted substantially longitudinally of the vehicle in the event of said violent shock on said one end whereby said unit is deviated downwardly of the extensions and framework as said unit moves toward the end of the vehicle opposed to said one end.

5. The structure claimed in claim 4, wherein said first and second means defining said upper faces comprise projecting portions which extend transversely from said unit, said upper faces being convex.

6. An automobile vehicle having a front end and a rear end and comprising in combination : a body, a rigid framework supporting said body, a cradle located adjacent one of said ends, means defining an inclined rigid first face rigidly integral with said framework, said framework and said first face terminating short of said one end to facilitate a crushing of said vehicle at said one end in the event of a violent shock on said one end which has a longitudinal component exceeding a predetermined magnitude, said face facing downwardly and being upwardly inclined from a point intermediate said vehicle ends toward said one end of the vehicle, an engine-transmission unit mounted on said cradle so as to be supported by said cradle, said framework and said means defining said rigid first face being more rigid than said cradle whereby upon said violent shock said cracle collapses before said first face and said framework, said unit having means defining a second face which faces upwardly and is in spaced relation to said first face and is capable of coming into contact with and travelling along and being deviated by said first face when said unit is shifted substantially longitudinally of the vehicle in the event of said violent shock on said one end whereby said unit is deviated downwardly of the framework as said unit moves toward the end of the vehicle opposed to said one end.

* * * * *